US007702082B2

(12) United States Patent
Mullis et al.

(10) Patent No.: US 7,702,082 B2
(45) Date of Patent: Apr. 20, 2010

(54) METHOD, SYSTEM, AND STORAGE MEDIUM FOR PROVIDING COMPREHENSIVE FACSIMILE INFORMATION WITHIN A VOICE MAIL SYSTEM

(75) Inventors: Karen S. Mullis, Loganville, GA (US); Anita Hogans Simpson, Decatur, GA (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 0 days.

(21) Appl. No.: 12/190,160

(22) Filed: Aug. 12, 2008

(65) Prior Publication Data

US 2008/0298557 A1 Dec. 4, 2008

Related U.S. Application Data

(63) Continuation of application No. 10/727,186, filed on Dec. 2, 2003, now Pat. No. 7,412,037.

(51) Int. Cl.
 H04M 1/64 (2006.01)
(52) U.S. Cl. .............................. 379/88.12; 379/100.01; 379/88.25; 379/88.14; 358/403
(58) Field of Classification Search .............. 379/88.12, 379/88.14, 100.01, 88.25, 67.1, 100.13; 358/403
See application file for complete search history.

(56) References Cited

U.S. PATENT DOCUMENTS

| 4,996,707 | A | * | 2/1991 | O'Malley et al. ...... 379/100.13 |
| 5,091,931 | A | * | 2/1992 | Milewski ............... 379/100.13 |
| 5,291,302 | A | | 3/1994 | Gordon et al. |
| 5,524,137 | A | | 6/1996 | Rhee |
| 5,530,740 | A | * | 6/1996 | Irribarren et al. ......... 379/88.17 |
| 5,943,400 | A | * | 8/1999 | Park ....................... 379/88.22 |
| 5,978,454 | A | | 11/1999 | King et al. |
| 6,330,079 | B1 | | 12/2001 | Dugan et al. |
| 6,415,021 | B1 | | 7/2002 | Oh |
| 6,442,243 | B1 | | 8/2002 | Valco et al. |
| 6,721,398 | B1 | * | 4/2004 | Pitcher .................... 379/88.13 |
| 7,046,772 | B1 | | 5/2006 | Moore et al. |
| 2002/0122541 | A1 | | 9/2002 | Metcalf |
| 2006/0083360 | A1 | * | 4/2006 | Moore et al. ............. 379/88.14 |

* cited by examiner

*Primary Examiner*—Olisa Anwah
(74) *Attorney, Agent, or Firm*—Cantor Colburn LLP

(57) ABSTRACT

A method, system, and storage medium for providing comprehensive facsimile information within a voicemail system are disclosed. The method includes receiving a facsimile at a voicemail system, storing the facsimile in a recipient voice mailbox, and interpreting elements of the facsimile. The interpreting is performed by optical character recognition software. Upon receiving a request by a voicemail recipient to access the voice mailbox, and absent any pre-defined user preferences with respect to the handling of the facsimile, the method includes converting the interpreted elements of the facsimile into audible speech via a text-to-speech engine, formatting the converted elements resulting in a voicemail facsimile notification, presenting the voicemail facsimile notification and options to a communications device associated with the voicemail recipient, and implementing one of the options selected by the recipient.

20 Claims, 4 Drawing Sheets

```
###############################################################
#  ABC COMPANY (123)456-7890     6 PGS    06/12/03   13:42:49  #
#                                                              #
###############################################################
```
⏟
300

302

FACSIMILE

TO:             MARY SMITH, PURCHASING MANAGER
FROM:           ABC COMPANY
DATE:           JUNE 12, 2003
SUBJECT:        NEW PRODUCT OFFERINGS
TOTAL PAGES:    6 INCLUDING COVER

IF YOU EXPERIENCE ANY DIFFICULTIES WITH THIS TRANSMISSION,
PLEASE CALL ANN JONES AT (123)456-7070.

*FIG. 3*

METHOD, SYSTEM, AND STORAGE MEDIUM FOR PROVIDING COMPREHENSIVE FACSIMILE INFORMATION WITHIN A VOICE MAIL SYSTEM

CROSS-REFERENCE TO RELATED APPLICATION

This application is a continuation of U.S. patent application Ser. No. 10/727,186, filed Dec. 2, 2003, the disclosure of which is incorporated by reference herein in its entirety.

BACKGROUND OF INVENTION

Embodiments of the invention relate generally to telecommunications and, more particularly, to a method, system, and storage medium for providing comprehensive facsimile information within a voicemail system.

Voicemail systems currently provide the ability to allow system users to receive facsimile transmissions in addition to voicemail messages. A sender of the facsimile enters the voicemail subscriber's general telephone number, whereby the incoming call is forwarded to the subscriber's voicemail using standard call forwarding services such as 'busy', 'no answer,' and 'unconditional.' Alternatively, the sender may be given a direct number to reach the voice mailbox without relying on call forwarding. In either case, the facsimile is stored at the voicemail platform and then associated with the subscriber's voice mailbox. When the subscriber checks the voice mailbox for new messages, he/she is notified that a facsimile has arrived. The notification includes limited information such as the date, time, and sometimes the number of pages in the facsimile. For various reasons, the subscriber oftentimes desires more specific information about the facsimile before making a determination of when or if the message will be accepted.

Accordingly, it would be desirable to provide a facsimile recipient with sufficient information about an incoming facsimile, within the context of a voicemail system, without requiring that the recipient first open or print the facsimile.

SUMMARY OF INVENTION

The foregoing discussed drawbacks and deficiencies of the prior art are overcome or alleviated by a method, system, and storage medium for providing comprehensive facsimile information within a voicemail system.

Exemplary embodiments of the invention relate to a method, system, and storage medium for providing comprehensive facsimile information within a voicemail system. The method includes receiving a facsimile at a voicemail system, storing the facsimile in a recipient voice mailbox, and interpreting elements of the facsimile. The interpreting is performed by optical character recognition software. Upon receiving a request by a voicemail recipient to access the voice mailbox, and absent any pre-defined user preferences with respect to the handling of the facsimile, the method includes converting the interpreted elements of the facsimile into audible speech via a text-to-speech engine, formatting the converted elements resulting in a voicemail facsimile notification, presenting the voicemail facsimile notification and options to a communications device associated with the voicemail recipient, and implementing one of the options selected by the recipient.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring to the exemplary drawings wherein like elements are numbered alike in the several FIGURES:

FIG. 3 is a sample facsimile cover page processed by the comprehensive voicemail tool in accordance with exemplary embodiments of the invention.

DETAILED DESCRIPTION

Disclosed herein is a method, system, and storage medium for providing comprehensive facsimile information within a voicemail system. By allowing a facsimile recipient to acquire detailed information about an incoming facsimile without first opening or printing the facsimile, the recipient can make informed decisions about which facsimiles require immediate attention, which facsimiles may be stored for later retrieval, and those that are unsolicited, misdirected, and/or otherwise undesirable. Incoming facsimiles are received into a voicemail system via traditional facsimile machines, from facsimile-enabled computer devices, or similar systems. The comprehensive voicemail tool receives the incoming facsimile, reads the facsimile information using optical character recognition technology, and converts the information into speech using a text-to-speech engine. The information is presented to the facsimile recipient upon accessing the voice mailbox who may perform one of several actions based upon the nature of the information presented, such as print the entire facsimile, store the facsimile, or delete the facsimile from the voicemail system. By providing this detail, the recipient is able to better control and track the number and types of facsimiles that are stored in the voice mailbox as well organize and prioritize the actions that may be required to be taken by the recipient as a result of the facsimiles received.

Forms of communication devices that may be serviced by the comprehensive voicemail tool include computers, wireline telephones, mobile devices such as personal digital assistants (PDAs), facsimiles, and wireless telephones with computer-enhanced capabilities. The comprehensive voicemail tool may be implemented on various types of existing communications network systems such as public switched telephone networks (PSTN), wireless, SMS, MMS, IP, WiFi, LAN, WAN, broadcast, video, radio, VoIP, etc.

Figure 1:
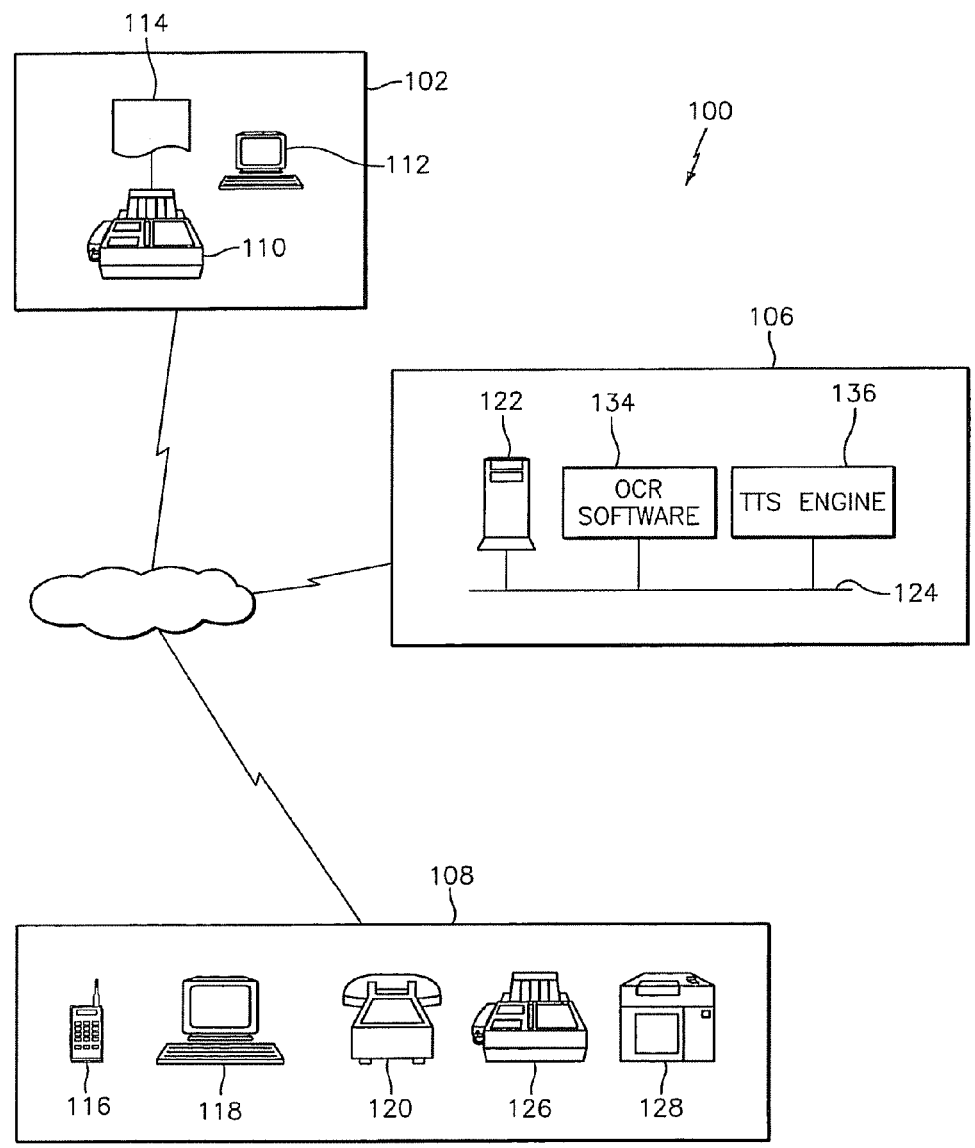
FIG. 1 is a block diagram of a system upon which the comprehensive voicemail tool is implemented in accordance exemplary embodiments of the invention.

Referring initially to FIG. 1, there is shown a block diagram of a network system for implementing the comprehensive voicemail tool. Network system 100 includes one or more sending devices 102 in communication with one or more of recipient devices 108 and a distributed network 106 via a network connection. Distributed network may include a local area network (LAN), a wide area network (WAN), a metropolitan area network (MAN), a virtual private network (VPN), or other suitable network.

Sending devices 102 include a facsimile machine 110 and a computer client 112. Remote recipient devices 108 include a wireless telephone 116, a computer client 118, a wireline telephone 120, a facsimile machine 126 and a printer 128. Distributed network 106 includes a server 122 in communication with optical character recognition (OCR) software 134 and a text-to-speech (TTS) engine 136 via a network link 124.

Computer clients 112 and 118 may include general-purpose desktop computers, laptop computers, or similar devices. Computer clients 112 and 118 are in communication with other entities of network system 100 via a network connection such as the Internet or other suitable means of networking architecture.

Facsimile machines 110 and 126 each comprise an optical scanner for digitizing images on paper, a printer for printing incoming fax messages, and a telephone for making the connection.

Telephone 120 represents a conventional wireline telephone that is connected to a public switched telephone network (PSTN) via the caller's voice lines.

Wireless telephone 116 represents a mobile calling device that utilizes mobile technology such as Code-Division Multiple Access (CDMA), GSM, or other digital cellular technology for allowing individuals to wirelessly communicate with other wireless and/or wireline communication devices.

Printer 128 represents a standard printing device that receives commands to print documents, facsimiles, etc. utilizing conventional print technology such as dot-matrix, ink-jet, laser, LCD/LED, or line printing.

Server 122 comprises a high-powered multiprocessor computer device including web server and applications server software, and a voicemail system. The voicemail system may include Computer Telephony Integration capabilities (CTI), and Unified Messaging (e.g., voice, fax and e-mail integrated into one inbox). Server 122 includes an internal storage unit for storing documents, data, email, voicemail, applications, etc., for its client systems. In alternative embodiments, storage units may be separate devices that are logically addressable from server 122 and may, in fact, be geographically dispersed from server 122.

Server 122 further executes OCR software 134 that is utilized by the comprehensive voicemail tool. An optical scanner is included along with OCR software 134 for reading text and for analyzing images. OCR software 134 is equipped to recognize various character types and fonts.

Text-to-speech (TTS) engine 136 converts text read by OCR software 134 to audible speech. Although not necessary to realize the advantages of the invention, preferred embodiments utilizes Digital Signal and Logical Inference Processor technology, which provides high quality TTS synthesis.

The comprehensive voicemail tool may be incorporated into an existing voicemail application or similar commercially-available product as an enhancement feature or may be provided via a third party application service provider (ASP) or e-utilities broker where service is provided for a per-use fee.

Figure 2:
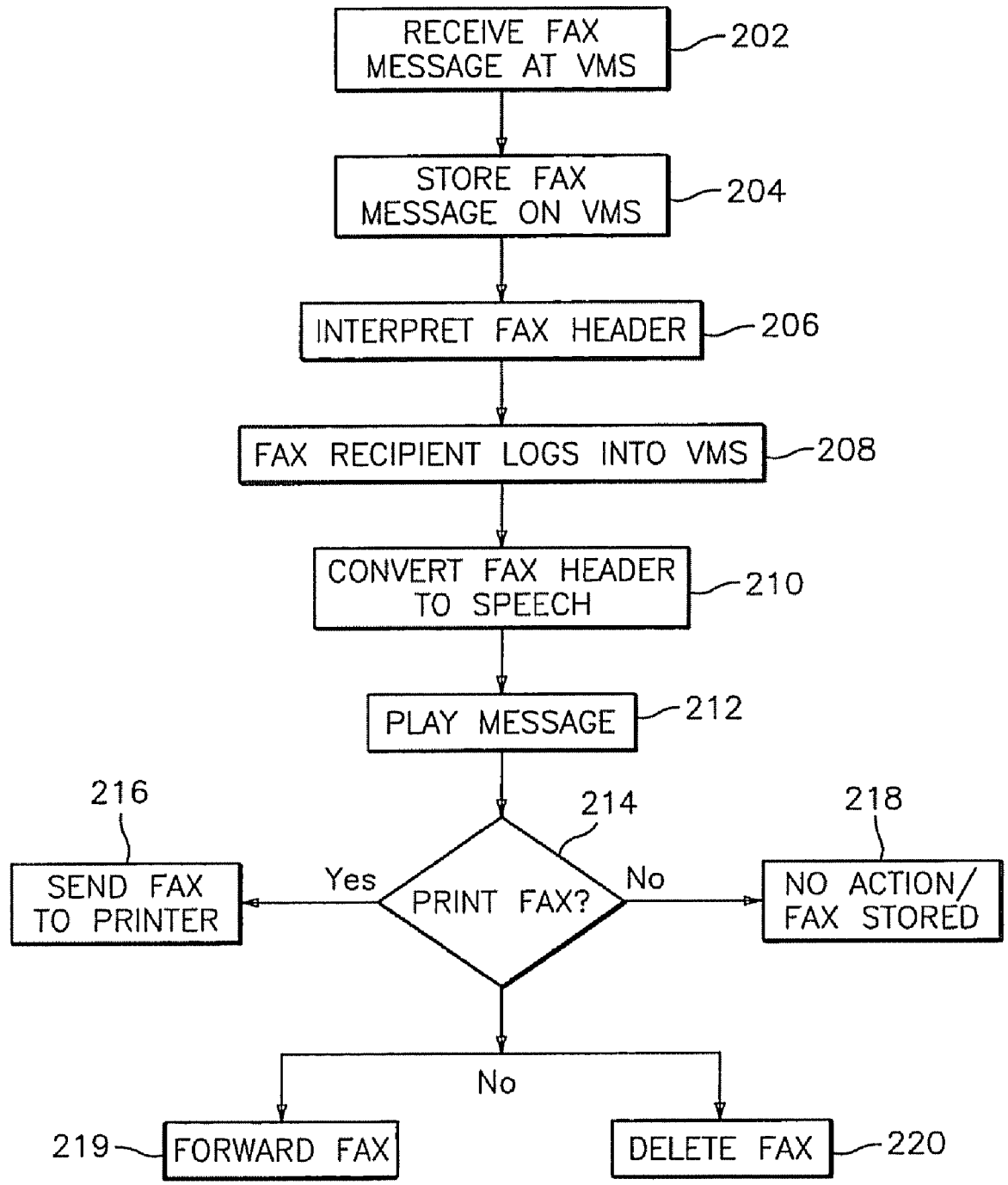
FIG. 2 is a flowchart describing a process of implementing the comprehensive voicemail tool in accordance with exemplary embodiments of the invention.

FIG. 2 is a flowchart describing the process of implementing the comprehensive voicemail tool in exemplary embodiments of the invention. The comprehensive voicemail tool receives a facsimile message from one of sending devices 102 at step 202. The facsimile is stored on the voicemail system that is resident on server 122 at step 204. The comprehensive voicemail tool reads the facsimile utilizing OCR software 134 at step 206. A sample facsimile cover page 300 including header information 302 is depicted in FIG. 3. The comprehensive voicemail tool possesses the intelligence to recognize and differentiate the elements within a facsimile irrespective of the order or placement of these elements on the facsimile. For example, using the sample facsimile 300 of FIG. 3, the comprehensive voicemail tool recognizes that header information 302 '6/12/03' is a date and that 'ABC Company' is the sender of the facsimile. Accordingly, if a first facsimile machine prints header information in a different sequence than a second facsimile machine, the comprehensive voicemail system is able to recognize the data elements of each machine and adapt to these varying formats. It will be understood that the comprehensive voicemail system will provide the capability to recognize abbreviations for elements presented in the facsimile and expand the abbreviations to their complete form. For example, a time displayed as '05:41p' may be converted to 'five forty-one p.m.' by the comprehensive voicemail tool.

Figure 4:
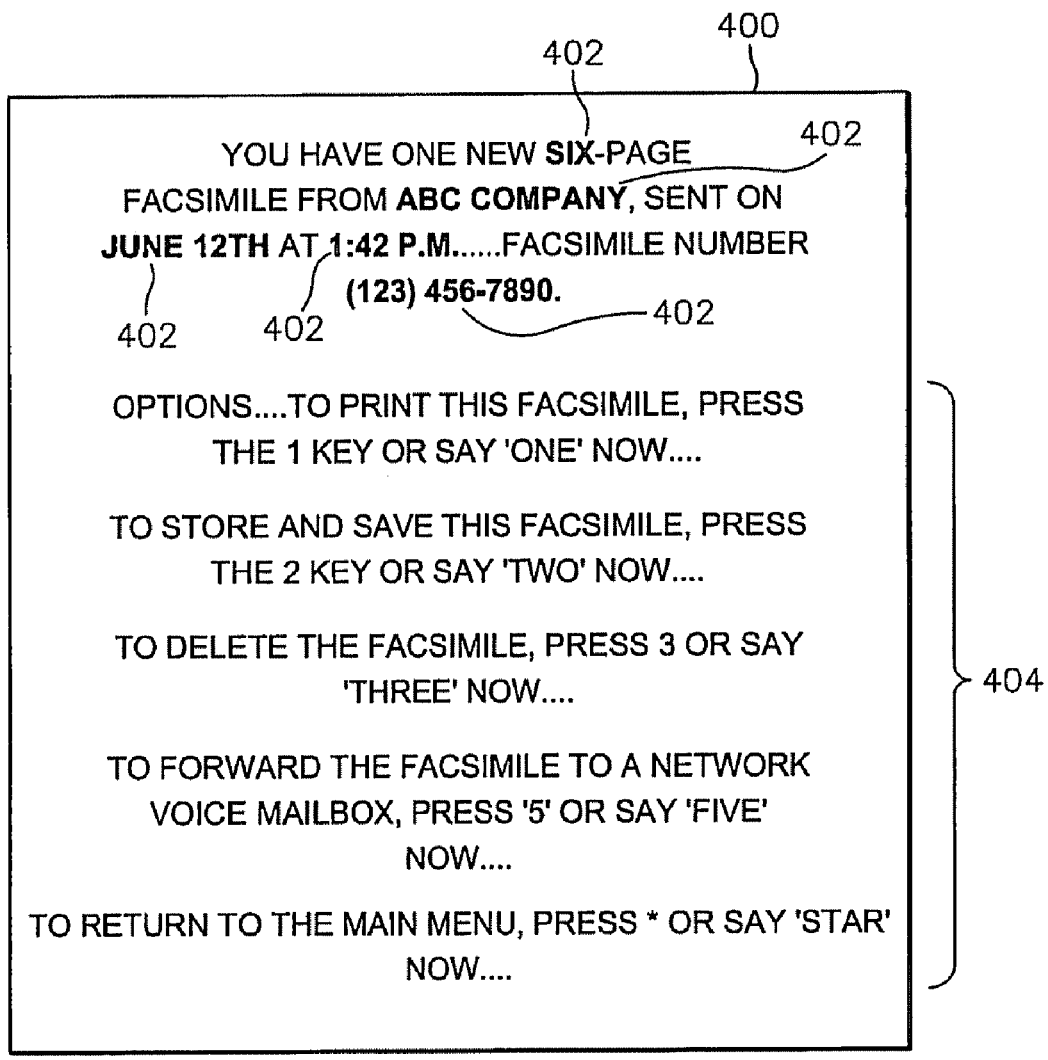
FIG. 4 illustrates a sample facsimile conversion script generated by the comprehensive voicemail tool in accordance with exemplary embodiments of the invention.

At step 208, the recipient of the facsimile logs onto the voicemail system on server 122 via one of remote recipient devices 116-120. The elements of header information 302 and other portions of the facsimile read in step 206 are converted to speech via text-to-speech engine 136. This step includes associating pre-established scripted material with the converted information. When the recipient device user accesses the voicemail system, the converted information and scripted material are presented to the recipient device in the form of a facsimile notification at step 212. A visual display of a sample scripted facsimile notification is shown in FIG. 4. As indicated in FIG. 4, elements 402 taken from header 302, as well as other portions of the facsimile, may be added to a pre-defined script and presented in audio form to the facsimile recipient. The pre-defined script may be devised in a way that presents the converted information in plain language form.

Armed with this detailed information about the facsimile, the recipient is able to make a determination of what action will be taken with respect to the facsimile. Embodiments of the invention may include options 404 that are presented in audio form and which instruct the facsimile recipient with information about how to handle the facsimile. As shown in FIG. 4, the recipient may print, save, delete, or forward the facsimile (e.g., the recipient forwards the facsimile to a networked fax-capable voice mailbox).

If the recipient decides to print the facsimile at step 214, the voicemail system sends the facsimile to a printer such as printer 128 at step 216. This may be accomplished by providing the voicemail system with a telephone number (e.g., local, long distance, international) for which printer 128 is addressable. Alternatively, the recipient may decide to take no further action at the moment at step 218, in which case, the facsimile remains stored in the voicemail system of server 122. Or, the recipient may forward the facsimile to a networked voice mailbox at step 219. Otherwise, if the recipient has no present or future interest in the facsimile, he/she may delete the facsimile from the voicemail system at step 220.

As will be appreciated from the above description, the restrictions and limitations that exist with voicemail and facsimile systems are efficiently overcome. By allowing a facsimile recipient to acquire detailed information about an incoming facsimile without first opening or printing the facsimile, the recipient can make informed decisions about which facsimiles require immediate attention, which facsimiles may be stored for later retrieval, and those that are unsolicited, misdirected, and/or otherwise undesirable.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing comprehensive facsimile information within a voicemail system, comprising:
   receiving a facsimile at a voicemail system;
   storing the facsimile in a recipient voice mailbox;
   interpreting elements of the facsimile, the interpreting performed by optical character recognition software; and
   upon receiving a request by a voicemail recipient to access the voice mailbox, and absent any pre-defined user preferences with respect to the handling of the facsimile:
      converting the interpreted elements of the facsimile into audible speech via a text-to-speech engine,
      formatting the converted elements resulting in a voicemail facsimile notification,
      presenting the voicemail facsimile notification and options to a communications device associated with the voicemail recipient, and
      implementing one of the options selected by the recipient.

2. The method of claim 1, wherein the elements are selected from a header in the facsimile.

3. The method of claim 2, wherein the header includes:
   a sender's facsimile number;
   a time and date of the facsimile transmission; and
   a number of pages transmitted.

4. The method of claim 1, wherein the options include:
   printing the facsimile,
   deleting the facsimile from the recipient voice mailbox,
   storing the facsimile in the recipient voice mailbox for later retrieval, and
   forwarding the facsimile to a networked fax-capable voice mailbox.

5. The method of claim 1, wherein the presenting the voicemail facsimile notification further includes presenting a scripted audio message along with the voicemail facsimile notification.

6. The method of claim 1, wherein:
   interpreting elements includes identifying abbreviated forms of the elements; and
   converting interpreted elements includes expanding the abbreviated forms of the elements.

7. A storage medium encoded with machine-readable computer program code for providing comprehensive facsimile information within a voicemail system, the storage medium including instructions for causing a computer to implement a method, comprising:
   receiving a facsimile at a voicemail system;
   storing the facsimile in a recipient voice mailbox;
   interpreting elements of a facsimile located in the facsimile, the interpreting performed by optical character recognition software; and
   upon receiving a request by a voicemail recipient to access the voice mailbox, and absent any pre-defined user preferences with respect to the handling of the facsimile:
      converting the interpreted elements of the facsimile into audible speech via a text-to-speech engine,
      formatting the converted elements resulting in a voicemail facsimile notification,
      presenting the voicemail facsimile notification of the facsimile and options to a communications device associated with the voicemail recipient, and
      implementing one of the options selected by the recipient.

8. The storage medium of claim 7, wherein the elements are selected from a header in the facsimile.

9. The storage medium of claim 8, wherein the header includes:
   a sender's facsimile number;
   a time and date of the facsimile transmission; and
   a number of pages transmitted.

10. The storage medium of claim 7, wherein the options include:
    printing the facsimile,
    deleting the facsimile from the recipient voice mailbox,
    storing the facsimile in the recipient voice mailbox for later retrieval, and
    forwarding the facsimile to a networked fax-capable voice mailbox.

11. The storage medium of claim 7, wherein the presenting the voicemail facsimile notification further includes presenting a scripted audio message along with the voicemail facsimile notification.

12. The storage medium of claim 7, wherein:
    interpreting elements includes identifying abbreviated forms of the elements; and
    converting interpreted elements includes expanding the abbreviated forms of the elements.

13. A communications network system for providing comprehensive facsimile information within a voicemail system, comprising:
    a server executing a voicemail system that includes at least one voice mailbox;
    a comprehensive voicemail tool executing on the server, the comprehensive voicemail tool including optical character recognition software and a text-to-speech engine;
    a link to a facsimile sending device;
    a link to a remote facsimile recipient device; and
    a facsimile received at the voicemail system, the facsimile transmitted by the facsimile sending device,
    wherein the comprehensive voicemail tool performs:
       storing the facsimile in the at least one voice mailbox, interpreting elements of the facsimile using the optical character recognition software, and upon receiving a request by a facsimile recipient to access the voice mailbox, and absent any pre-defined user preferences with respect to the handling of the facsimile:

converting interpreted elements of the facsimile into audible speech via a text-to-speech engine, formatting converted elements resulting in a voicemail facsimile notification, presenting the voicemail facsimile notification elements of the facsimile and options to the facsimile recipient, and implementing one of the options selected by the recipient.

14. The system of claim 13, wherein the elements are selected from a header in the facsimile.

15. The system of claim 14, wherein the header includes:
a sender's facsimile number;
a time and date of the facsimile transmission; and
a number of pages transmitted.

16. The system of claim 13, wherein the options include:
printing the facsimile,
deleting the facsimile from the recipient voice mailbox,
storing the facsimile in the recipient voice mailbox for later retrieval, and
forwarding the facsimile to a networked fax-capable voice mailbox.

17. The system of claim 13, wherein the voicemail facsimile notification further includes a scripted audio message along with the voicemail facsimile notification.

18. The system of claim 13, wherein:
interpreting elements includes identifying abbreviated forms of the elements; and
converting interpreted elements includes expanding the abbreviated forms of the elements; and
wherein, the remote facsimile recipient device comprises at least one of:
a wireless telephone;
a wireline telephone;
a voice over Internet telephone; and
a computer.

19. The communications network system of claim 3, wherein the facsimile sending device comprises at least one of:
a facsimile machine;
a facsimile-enabled computer;
a facsimile-enabled voicemail system; and
a personal digital assistant.

20. The communications network system of claim 13, wherein the communications network comprises at least one of:
a public switched telephone network;
an Internet network;
a radio network; and
a VoIP network.

* * * * *